United States Patent
Thayer et al.

(10) Patent No.: US 12,438,215 B2
(45) Date of Patent: Oct. 7, 2025

(54) THERMAL CONTROL FOR BATTERY PACKS

(71) Applicant: Rivian IP Holdings, LLC, Irvine, CA (US)

(72) Inventors: Brandon Thayer, Mission Viejo, CA (US); Ryan Arens, Irvine, CA (US); Tripur Udhav Mahajan, Irvine, CA (US); Ryan Michael Norris, Mission Viejo, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 18/527,194

(22) Filed: Dec. 1, 2023

(65) Prior Publication Data

US 2025/0183414 A1   Jun. 5, 2025

(51) Int. Cl.
| | |
|---|---|
| *H01M 10/6568* | (2014.01) |
| *H01M 10/625* | (2014.01) |
| *H01M 50/249* | (2021.01) |
| *H01M 50/505* | (2021.01) |
| *H01M 50/209* | (2021.01) |

(52) U.S. Cl.
CPC ..... *H01M 10/6568* (2015.04); *H01M 10/625* (2015.04); *H01M 50/249* (2021.01); *H01M 50/505* (2021.01); *H01M 50/209* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 4,522,898 | A | * | 6/1985 | Esrom ............... H01M 10/625 |
| | | | | 429/120 |
| 10,186,737 | B2 | | 1/2019 | Iqbal et al. |
| 11,565,579 | B2 | | 1/2023 | Kellner et al. |
| 2004/0180254 | A1 | * | 9/2004 | England ............. H01M 8/0276 |
| | | | | 429/425 |
| 2014/0363720 | A1 | * | 12/2014 | Ackermann ...... H01M 10/6557 |
| | | | | 29/623.1 |
| 2020/0148066 | A1 | * | 5/2020 | Sekar ................. H01M 50/262 |
| 2020/0153219 | A1 | * | 5/2020 | Baseri ............... H01M 50/522 |
| 2023/0084361 | A1 | * | 3/2023 | Wang ................. H01M 50/284 |
| | | | | 429/163 |

FOREIGN PATENT DOCUMENTS

| | | | | |
|---|---|---|---|---|
| CN | 106410324 A | * | 2/2017 | |
| WO | WO-2021175051 A1 | * | 9/2021 | ............. B60L 50/64 |

OTHER PUBLICATIONS

Machine translation of CN 106410324 A, published on Feb. 15, 2017 (Year: 2017).*
Fitting—definition, available online at https://www.thefreedictionary.com/fitting, date unknown.*

* cited by examiner

*Primary Examiner* — Anca Eoff
(74) *Attorney, Agent, or Firm* — BAKERHOSTETLER

(57) ABSTRACT

Aspects of the disclosure relate to thermal management aspects of a battery pack. A casted front member of a battery pack enclosure may facilitate cooling of a high voltage distribution box (HVDB) within a cavity of the casted front member. Cooling of other electrical components, such as a busbar can also be provided. Cooling of the HVDB and/or other electrical components external to the battery modules and/or battery cells in a battery pack can facilitate fast charging, vehicle acceleration, component reliability, and/or other advantages.

16 Claims, 13 Drawing Sheets

THERMAL CONTROL FOR BATTERY PACKS

INTRODUCTION

Batteries are often used as a source of power, including as a source of power for electric vehicles that include wheels that are driven by an electric motor that receives power from the battery.

Aspects of the subject technology can help to improve the thermal management of battery packs, which can improve the efficiency, range, charging rate, power delivery, performance, and proliferation of electric vehicles, which can help to mitigate climate change by reducing greenhouse gas emissions.

SUMMARY

Aspects of the subject disclosure relate to cooling features for a battery pack enclosure. For example, a casted front member of the battery pack enclosure facilitates cooling of the high voltage distribution box (HVDB) within a cavity of the casted front member. Cooling of other electrical components, such as a busbar can also be provided. Cooling of the HVDB and/or other electrical components that are outside of the battery modules can facilitate fast charging, vehicle acceleration, component reliability, safety, and other advantages.

In accordance with aspects of the subject disclosure, an apparatus is provided that includes a casted member for an enclosure for a battery pack, the casted member having a cavity configured to enclose a high voltage distribution box, and an opening configured to receive a fitting for a coolant port. The casted member may also include an additional cavity configured to receive a battery module for the battery pack, and an additional opening configured to receive an additional fitting for an additional coolant port to the additional cavity. The opening may include a first threaded opening configured to receive a first thread-in fitting, and the additional opening may include a second threaded opening configured to receive a second thread-in fitting.

The casted member may also include an additional opening configured to receive an additional fitting for an additional coolant port to an additional cavity, external to the casted member and within the enclosure, that is configured to receive one or more battery modules for the battery pack. In one or more implementations, the opening may include a first threaded opening configured to receive a first thread-in fitting, and the additional opening may include a second threaded opening configured to receive a second thread-in fitting. In one or more other implementations, the opening may be configured to receive any other type of component for attaching a hose, pipe, or other fluid line thereto, such as a quick connect fitting or other type of fitting. The casted member may also include one or more fluid channels within one or more walls of the casted member, the one or more fluid channels fluidly coupled to the opening. The casted member may include a casted front portion of the enclosure for the battery pack, the casted member may be configured to attach to first and second sidewalls, a base plate, and a lid for the enclosure, and the battery pack may be configured to provide power for an electric vehicle.

In accordance with other aspects of the subject disclosure, a battery pack is provided that includes a casted member for an enclosure for the battery pack, the casted member having a cavity configured to enclose a high voltage distribution box, and an opening configured to receive a fitting for a coolant port. The battery pack may also include the fitting in the opening, the high voltage distribution box disposed within the cavity, and one or more fluid channels that extend from the fitting to cool the high voltage distribution box.

The battery pack may also include an additional electrical component in the cavity. At least one of the one or more fluid channels that extend from the fitting are configured to cool the additional electrical component. The additional electrical component may include a busbar that is configured to electrically couple to one or more battery modules within the enclosure.

At least one of the one or more fluid channels may be in direct thermal contact with the high voltage distribution box. The battery pack may also include a cooling structure that thermally couples the one or more fluid channels to the high voltage distribution box.

The casted member may also include an additional opening configured to receive an additional fitting for an additional coolant port out of the cavity. The opening may be formed in an outer wall of the casted member, and the additional opening may be formed in an inner wall of the casted member.

The battery pack may also include a plurality of housing structures that combine with the casted member to form the enclosure of the battery pack, and one or more battery modules disposed in an additional cavity, separate from the cavity, within the enclosure. The battery pack may also include the fitting in the opening, the additional fitting in the additional opening, the high voltage distribution box disposed within the cavity, one or more fluid channels within one or more walls of the casted member that extend from the fitting to the additional fitting to cool the high voltage distribution box, and one or more fluid channels coupled to the additional fitting and configured to cool the one or more battery modules.

In accordance with other aspects of the subject disclosure, a method is provided that includes providing a coolant into one or more fluid channels that are integrally formed within a casted member of an enclosure of a battery pack; and cooling, with the coolant, a high voltage distribution box that is disposed within a cavity in the casted member.

The high voltage distribution box may be disposed within a cavity in the casted member of the enclosure of the battery pack. The cavity may include a first cavity within the enclosure, and the method may also include providing the coolant that has cooled the high voltage distribution box from the one or more fluid channels into a second cavity within the enclosure, the second cavity enclosing one or more battery cells of the battery pack; and cooling, with the coolant, the one or more battery cells within the second cavity.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to thermal management for battery packs, such as for battery packs for electric vehicles. In one or more implementations, one or more coolant pathways are integrally formed within a casted member that forms a portion of an enclosure for a battery pack. In one or more implementations, cooling is provided for a high voltage distribution box (HVDB) for a battery pack.

Figure 1A:
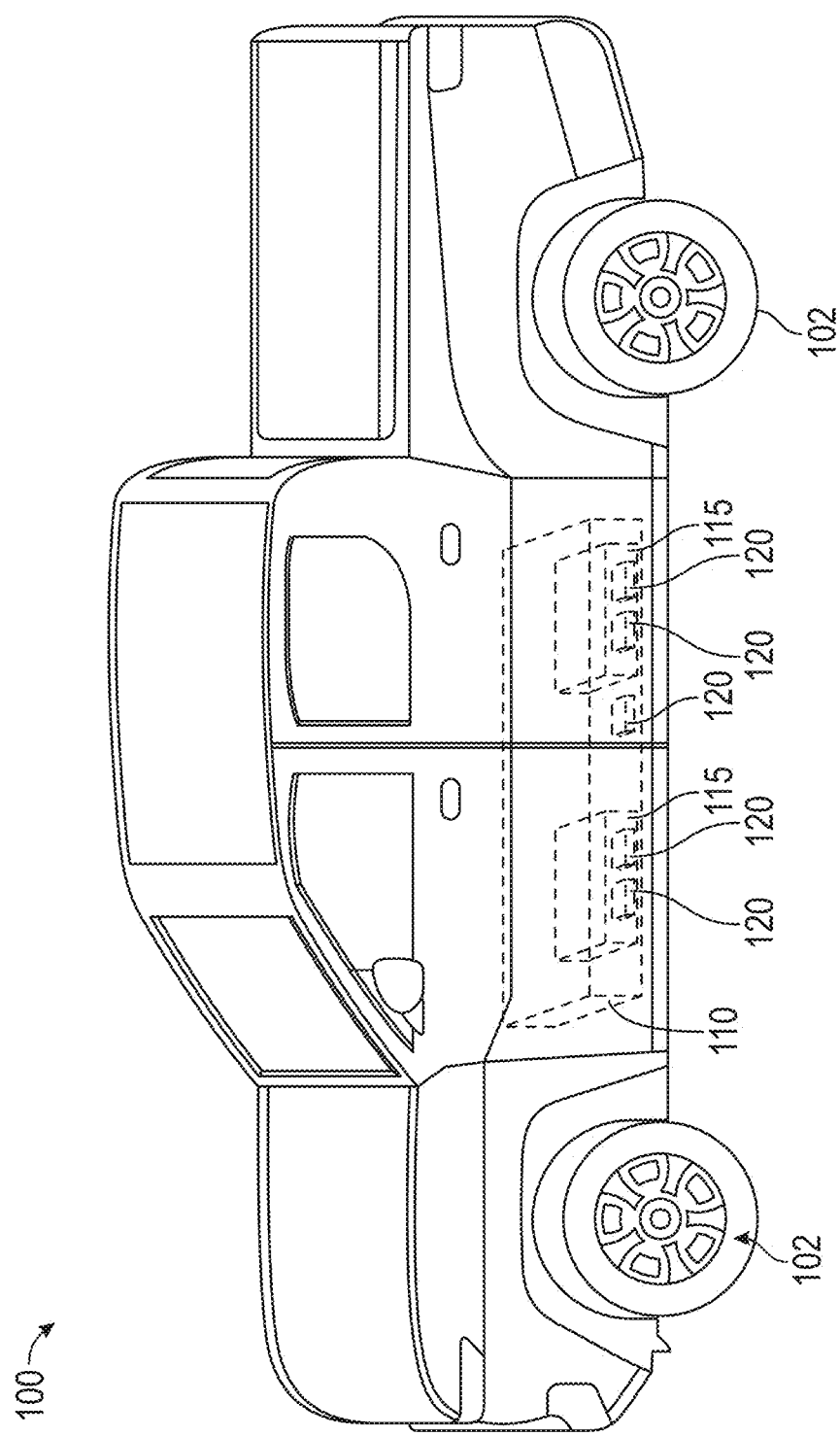
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
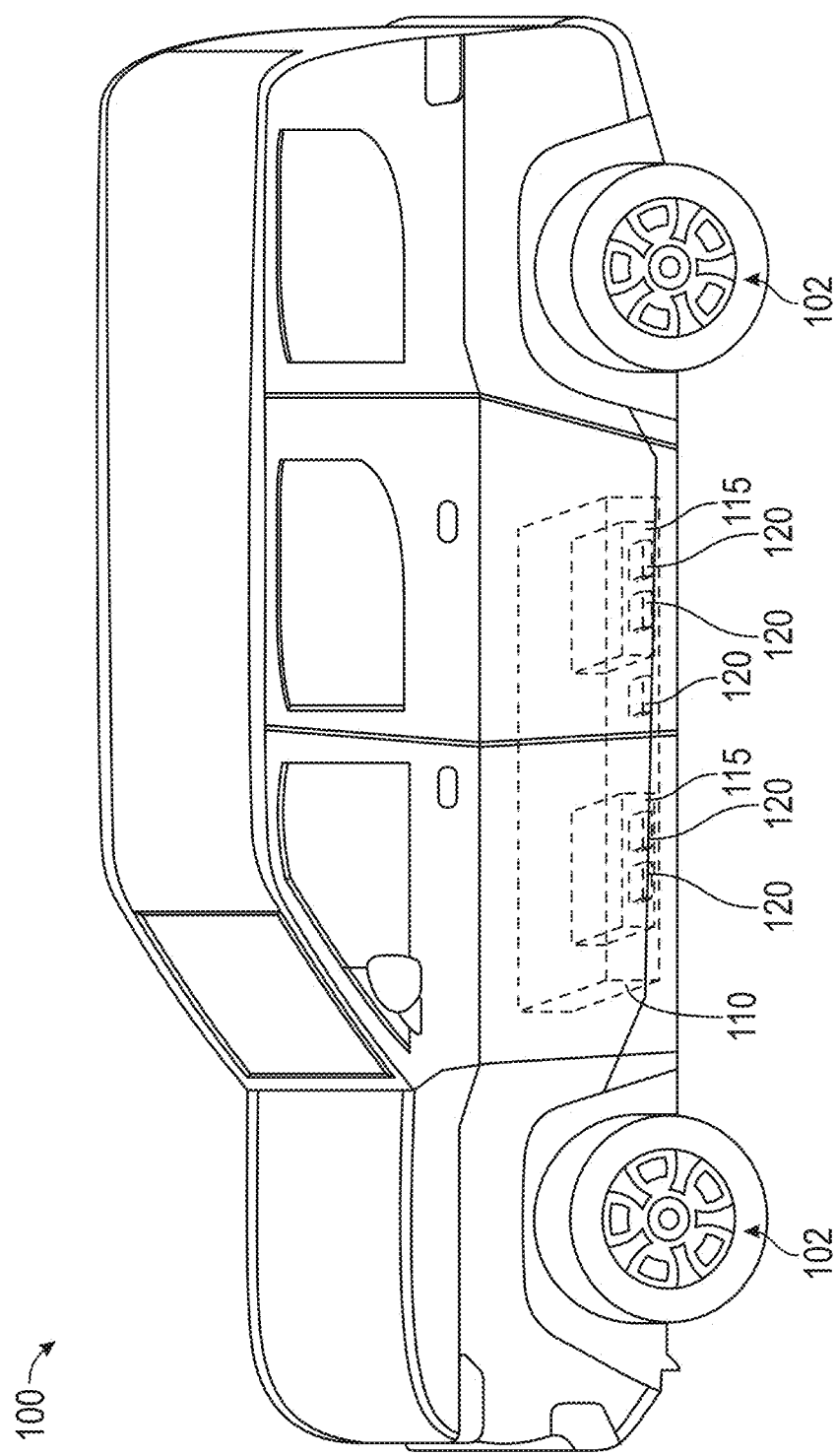

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
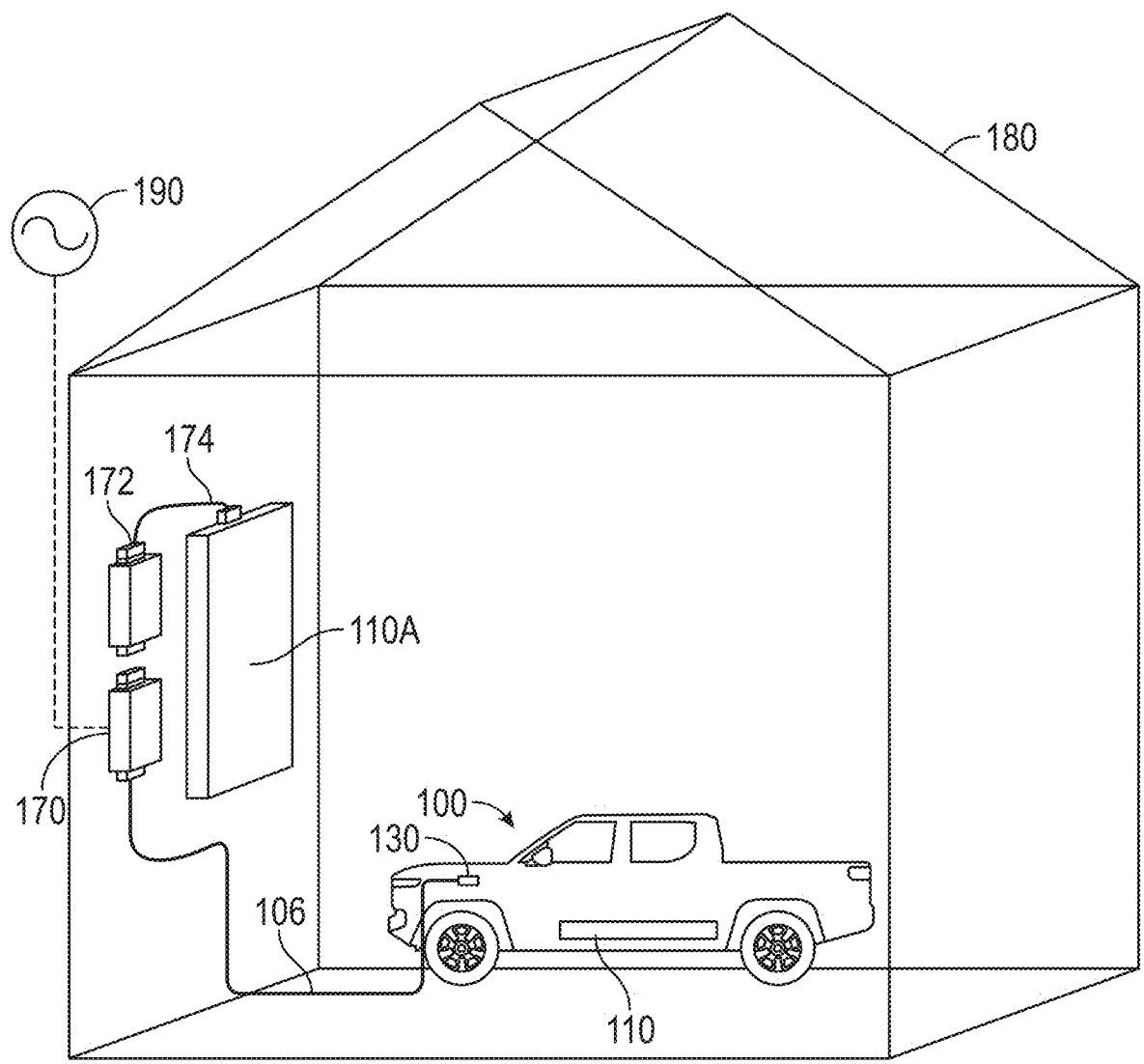
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
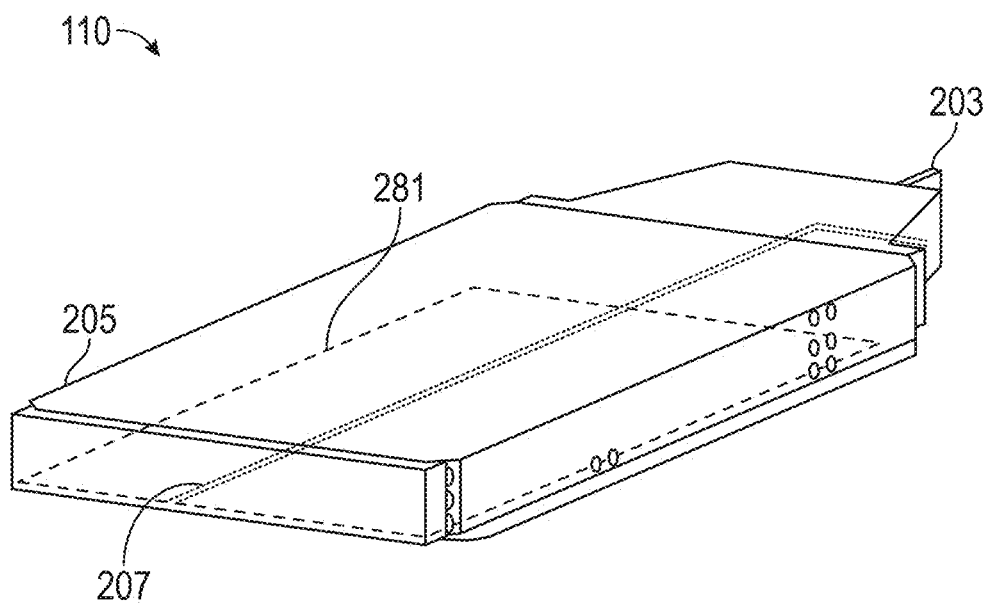
FIG. 2A illustrates a schematic perspective view of a battery pack in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within an enclosure 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include an enclosure 205 (e.g., also referred to as a battery pack housing or pack frame). For example, the enclosure 205 may house or enclose one or more battery modules 115 and/or one or more battery cells 120, and/or other battery pack components. In one or more implementations, the enclosure 205 may include or form a shielding structure, such as a skid plate, on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the enclosure 205, such as by distributing fluid through the battery pack 110.

For example, the thermal control structures 207 may form a part of a thermal/temperature control or heat exchange system that includes one or more thermal components 281 such as plates or bladders that are disposed in thermal contact with one or more battery modules 115 and/or battery cells 120 disposed within the enclosure 205. For example, a thermal component 281 may be positioned in contact with one or more battery modules 115, battery units, batteries, and/or battery cells 120 within the enclosure 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
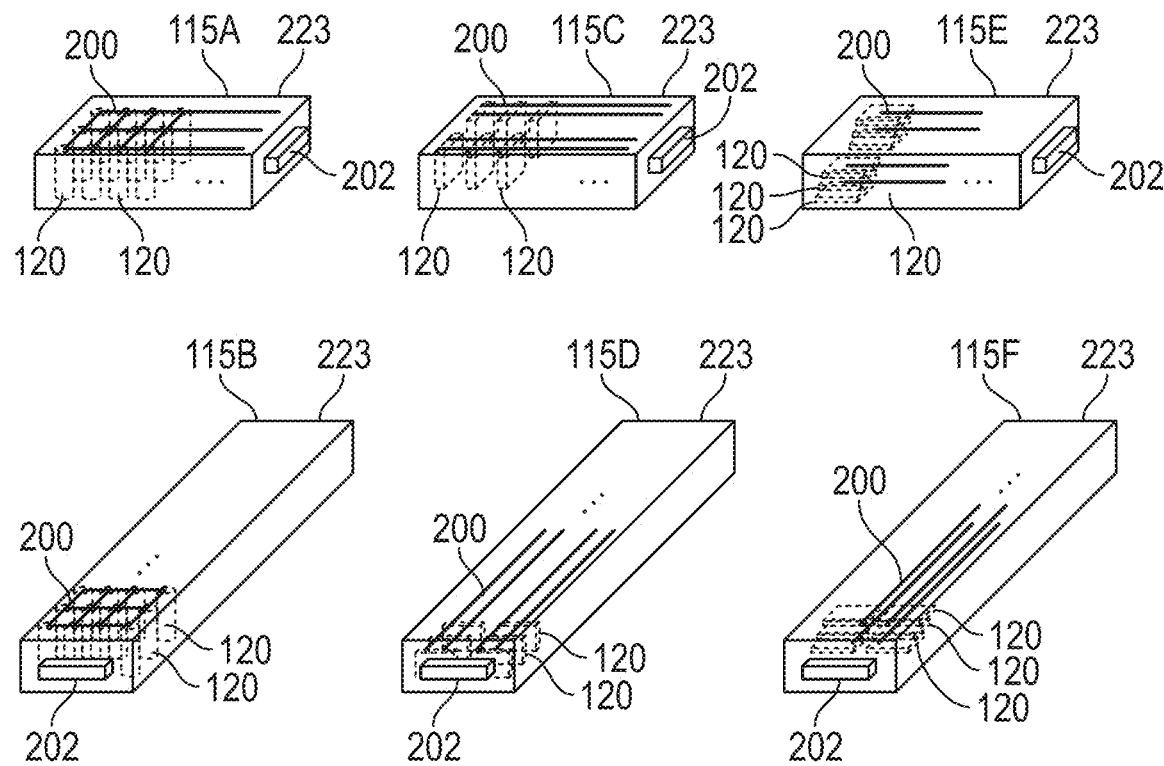
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the enclosure 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the enclosure 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the enclosure 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the enclosure 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the enclosure 205) may include or define a plurality of structures for positioning of the battery cells 120 directly within the enclosure 205.

Figure 2C:
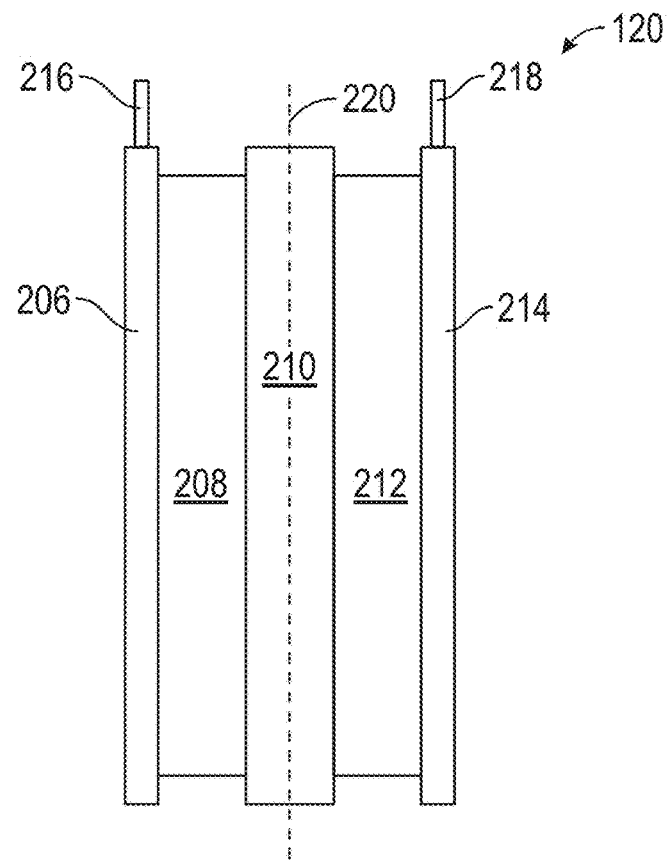
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, sodium ion battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
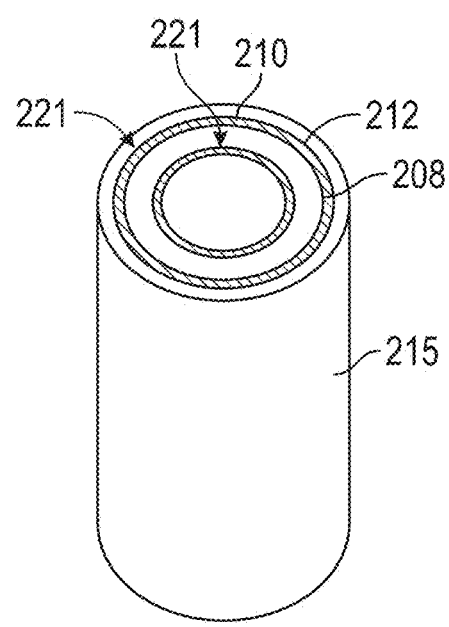
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
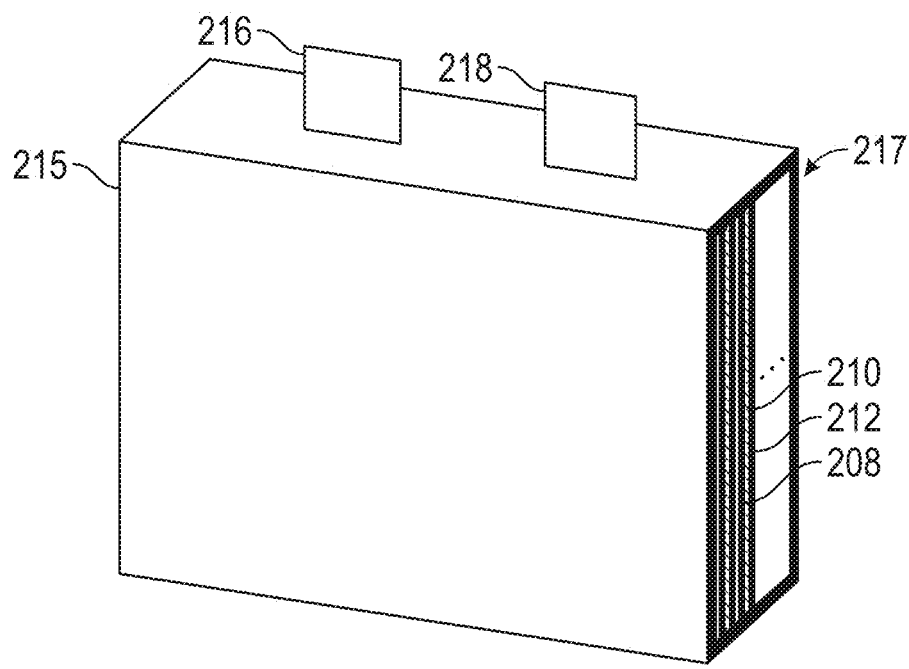
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
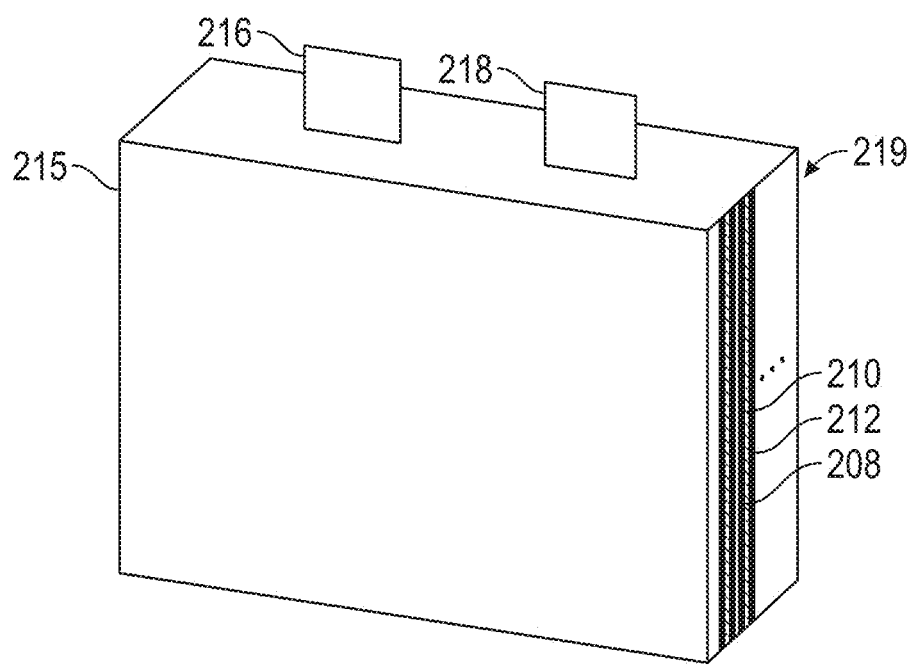
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
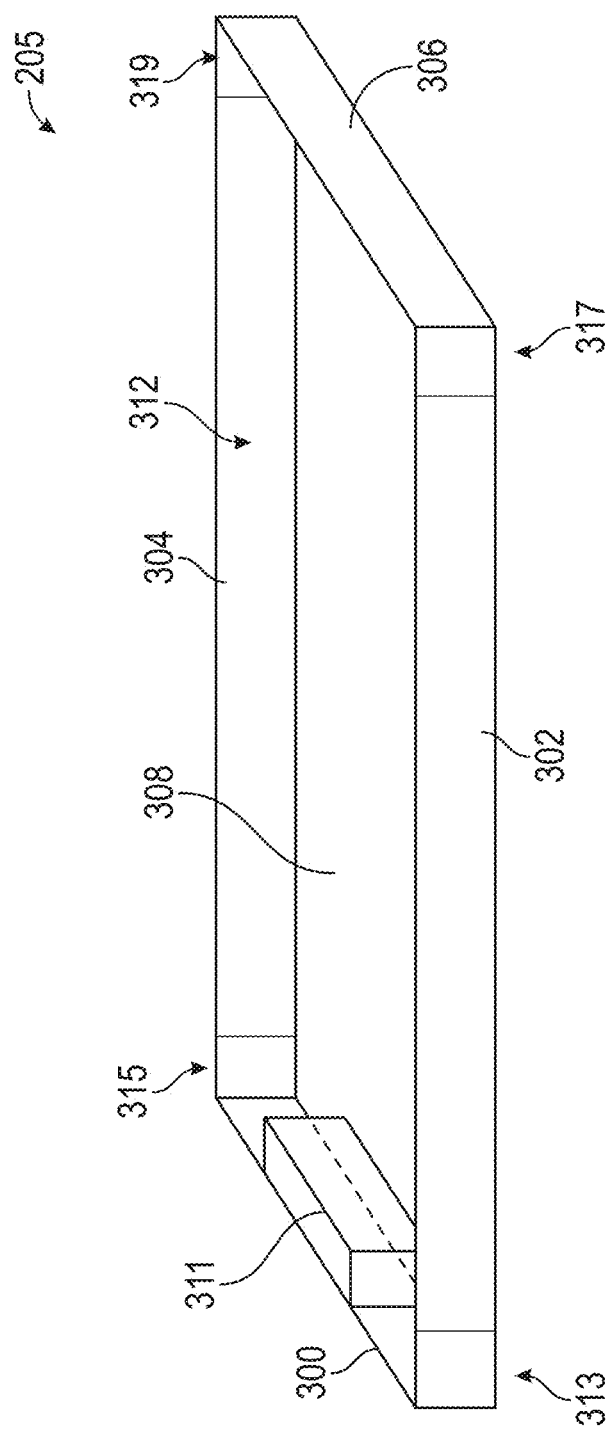
FIG. 3 illustrates a perspective view of an enclosure for a battery pack in accordance with one or more implementations.

FIG. 3 illustrates a schematic perspective view of an enclosure 205 for the battery pack 110. In this example, the enclosure 205 may include a casted member 300, an extruded sidewall structure 302 (e.g., a first siderail or extruded sidewall), an extruded sidewall structure 304 (e.g., a second siderail or extruded sidewall), a casted member 306, and a bottom plate 308. For example, the casted member 300 may be a monolithic, unitary member that has been formed from, for example, metal (e.g., aluminum, steel, another metal, and/or an alloy thereof) in a casting operation (e.g., a die casting operation). The casted member 300 may be a casted front member for the enclosure 205, configured for positioning near or toward a front of a vehicle in which battery pack 110 is installed. For example, the casted member 300 may form a front wall of the enclosure 205, and may have an outer surface that defines the front surface of the enclosure 205 and the battery pack 110. As shown, the casted member 300 may include end portions 313 and 315 (e.g., corner portions) that bend way from the front wall to form respective portions of respective sidewalls of the enclosure 205.

The casted member 306 may be a monolithic, unitary member that has been formed from, for example, metal (e.g., aluminum, steel, another metal, and/or an alloy thereof) in a casting operation (e.g., a die casting operation). The casted member 306 may be a casted rear member for the enclosure 205, configured for positioning near or toward a rear of a vehicle in which battery pack 110 is installed. For example, the casted member 306 may form a rear wall of the enclosure 205, and may have an outer surface that defines the rear surface of the enclosure 205 and the battery pack 110. As shown, the casted member 306 may include end portions 317 and 319 (e.g., corner portions) that bend way from the rear wall to form respective portions of the respective sidewalls of the enclosure 205. The end portions 313 and 315 of the casted member 300, and the end portions 317 and 319 of the casted member 306, may allow the extruded sidewall structure 302 and the extruded sidewall structure 304 to be substantially linear sidewall structures that each extend along a substantially straight path between the casted member 300 and the casted member 306.

As shown, the casted member 300 may include and/or define a cavity 311. As described in further detail hereinafter, the cavity 311 may be configured to enclose electrical circuitry, such as a high voltage distribution box (HVDB) that is electrically coupled to one or more battery modules 115 and/or battery cells 120 of the battery pack 110. For example, the battery modules 115 and/or battery cells 120 may be enclosed in an additional cavity 312, separate from the cavity 311, defined in part by the extruded sidewall structure 302 and the extruded sidewall structure 304.

For example, the extruded sidewall structure 302 may be a single monolithic unitary structure that has been formed from, for example, metal (e.g., aluminum, steel, another metal, and/or an alloy thereof) in an extrusion operation. The extruded sidewall structure 304 may be a single monolithic unitary structure that has been formed from, for example, metal (e.g., aluminum, steel, another metal, and/or an alloy thereof) in an extrusion operation.

Figure 4:
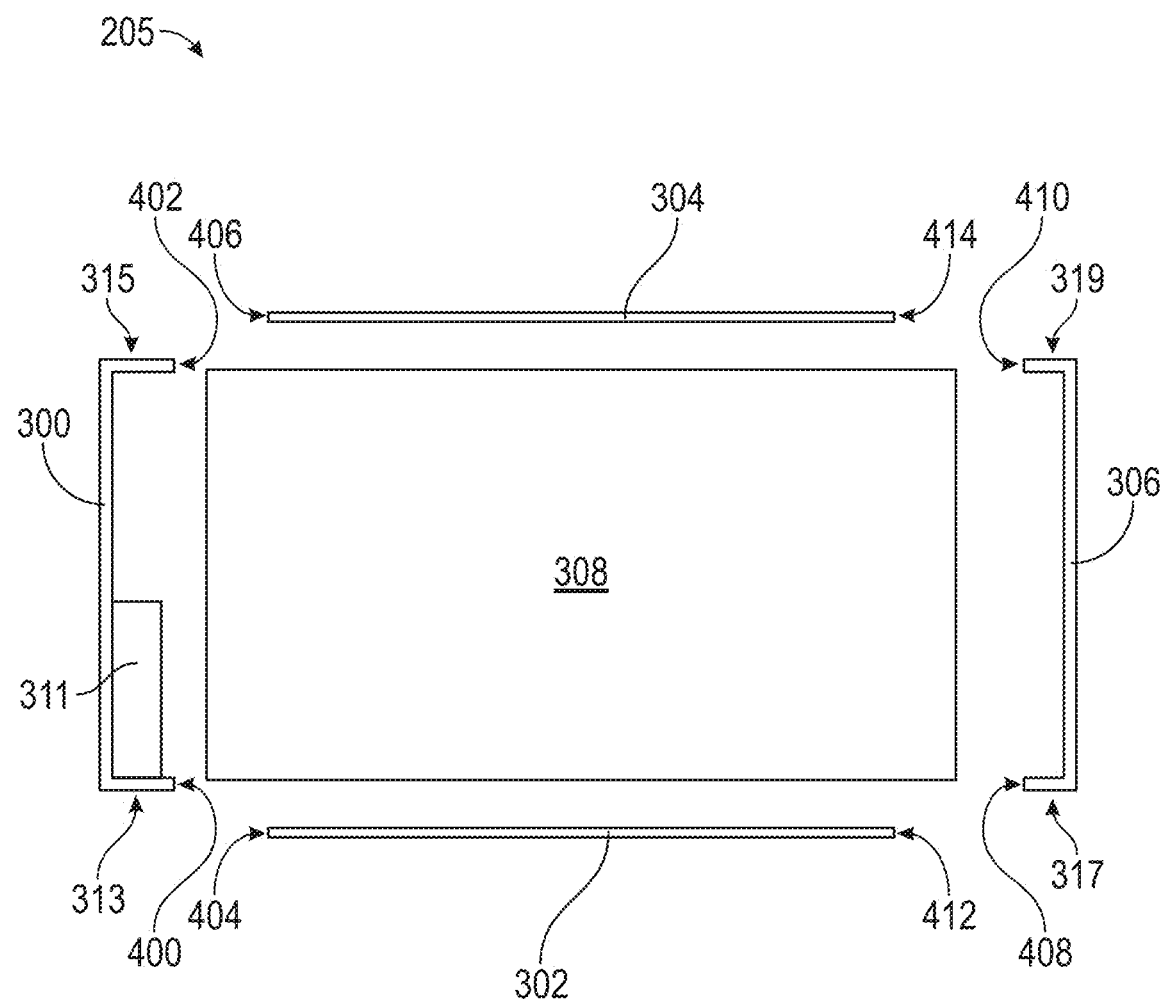
FIG. 4 illustrates an exploded top view of an enclosure for a battery pack in accordance with one or more implementations.

FIG. 4 illustrates an exploded top view of the enclosure 205 of FIG. 3. As shown in FIG. 4, the casted member 300 may include a first end surface 400 configured to be welded to a first end surface 404 of the extruded sidewall structure 302 and a second end surface 402 configured to be welded to a first end surface 406 of the extruded sidewall structure 304. The casted member 306 may include a first end surface 408 configured to be welded to a second end surface 412 of the extruded sidewall structure 302 and a second end surface 410 configured to be welded to a second end surface 414 of the extruded sidewall structure 304. The bottom plate 308 may be attached to (e.g., bottom surfaces of) the casted member 300, the extruded sidewall structure 302, the casted member 306, and the extruded sidewall structure 304 via welding and/or via one or more fasteners such as screws or bolts to form the enclosure 205. In one or more implementations, a lid (not shown in FIGS. 3 and 4) may be attached to (e.g., top surfaces of) the casted member 300, the extruded sidewall structure 302, the casted member 306, and the extruded sidewall structure 304 via welding and/or via one or more fasteners such as screws or bolts to close the enclosure 205 (e.g., after one or more battery modules, battery cells, cooling structures, and/or other electrical, structural, and/or thermal components have been installed in the cavity 312 and/or the cavity 311).

Figure 5:
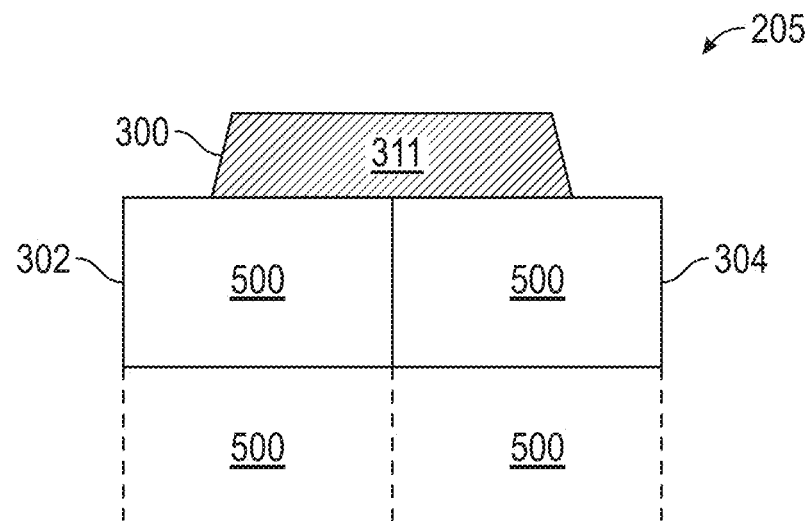
FIG. 5 illustrates a schematic top view of an enclosure for a battery pack with an even number of battery modules in accordance with one or more implementations.
Figure 6:
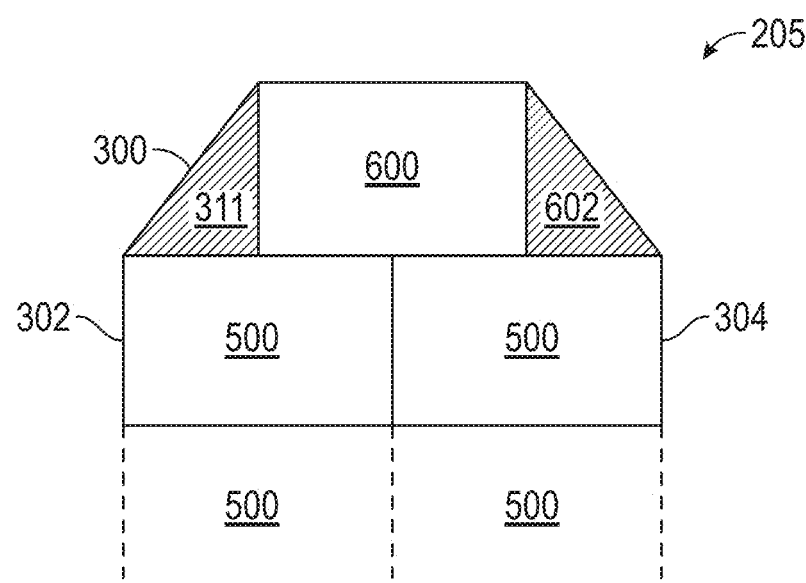
FIG. 6 illustrates a schematic top view of an enclosure for a battery pack with an odd number of battery modules in accordance with one or more implementations.

In various implementations, the enclosure 205 may be arranged to house an even or odd number of battery modules. For example, FIG. 5 illustrates a schematic top view of the enclosure 205 configured for an even number of battery modules. As shown in FIG. 5, the casted member 300 includes the cavity 311 (e.g., for an HVDB and/or other electrical distribution and/or current collection components), without including space for a battery module therewithin. In contrast, FIG. 6 illustrates a schematic top view of the enclosure 205 configured for an odd number of battery modules. As shown in FIG. 6, the casted member 300 may include the cavity 311 (e.g., for an HVDB and/or other electrical distribution and/or current collection components), and may include an additional cavity 600 that is configured to receive a battery module 115. As shown, the casted member 300 in the example of FIG. 6 may also, optionally, include a cavity 602 on an opposite side of the casted member 300 from the cavity 311. The cavity 602 may also be configured to enclose one or more components of the battery pack 110. In each of the examples of FIGS. 5 and 6, the extruded sidewall structures 302 and 304 extend from opposing ends of the casted member 300, and the cavity 312 includes multiple portions 500, each configured to receive a battery modules 115.

Figure 7:
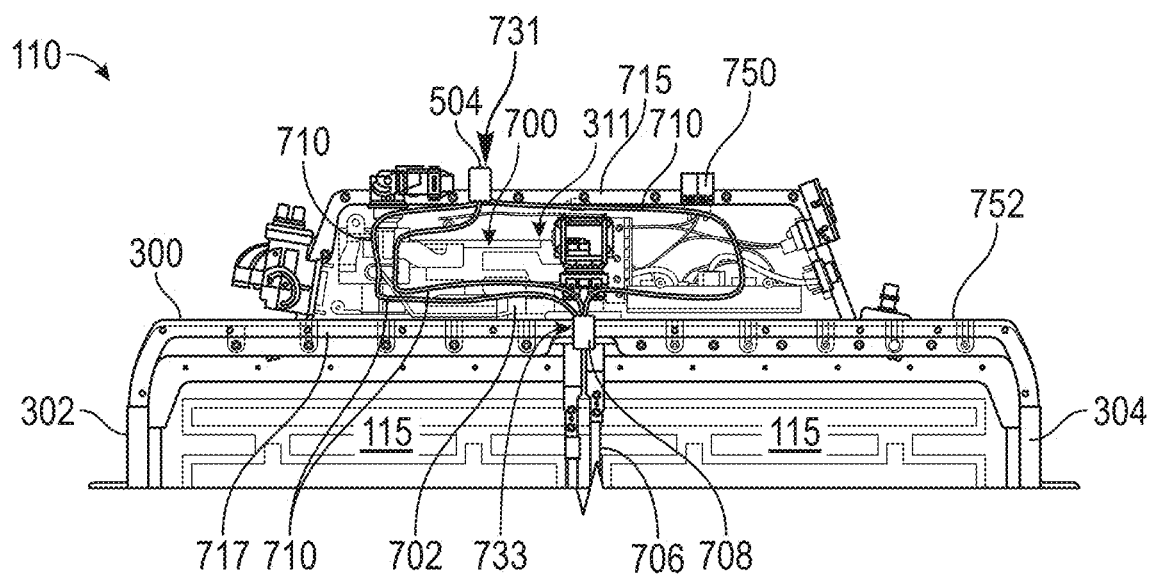
FIG. 7 illustrates a top view of a portion of battery pack with an even number of battery modules and one or more coolant pathways in accordance with one or more implementations.

FIG. 7 illustrates a portion of a battery pack 110 in the configuration of FIG. 5 in which the battery pack includes an even number of battery modules 115. In the example of FIG. 7, portions of two battery modules 115 are visible, having been installed in two of the portions 500 of the cavity 312. In the example of FIG. 7, a high voltage distribution box 700 (e.g., also referred to as an HVDB) is visible in the cavity 311. The high voltage distribution box 700 may be electrically coupled to the battery modules 115, such as via a connector and/or a cable that routes a conductive connection from the cavity 311 into the cavity 312 in which the battery modules 115 are installed. In the example of FIG. 7, the high voltage distribution box 700 is disposed within the cavity 311 defined by the casted member 300, and the casted member 300 is provided without space for a battery module 115. For example, the high voltage distribution box 700 may include electrical components for control of charging of the battery cells 120 in the battery modules 115, discharging of the battery cells 120 in the battery modules 115, short-circuit protection, current and/or voltage measurements, temperature monitoring, and/or other voltage distribution, control, and/or monitoring circuitry for the battery pack 110.

Figure 8:
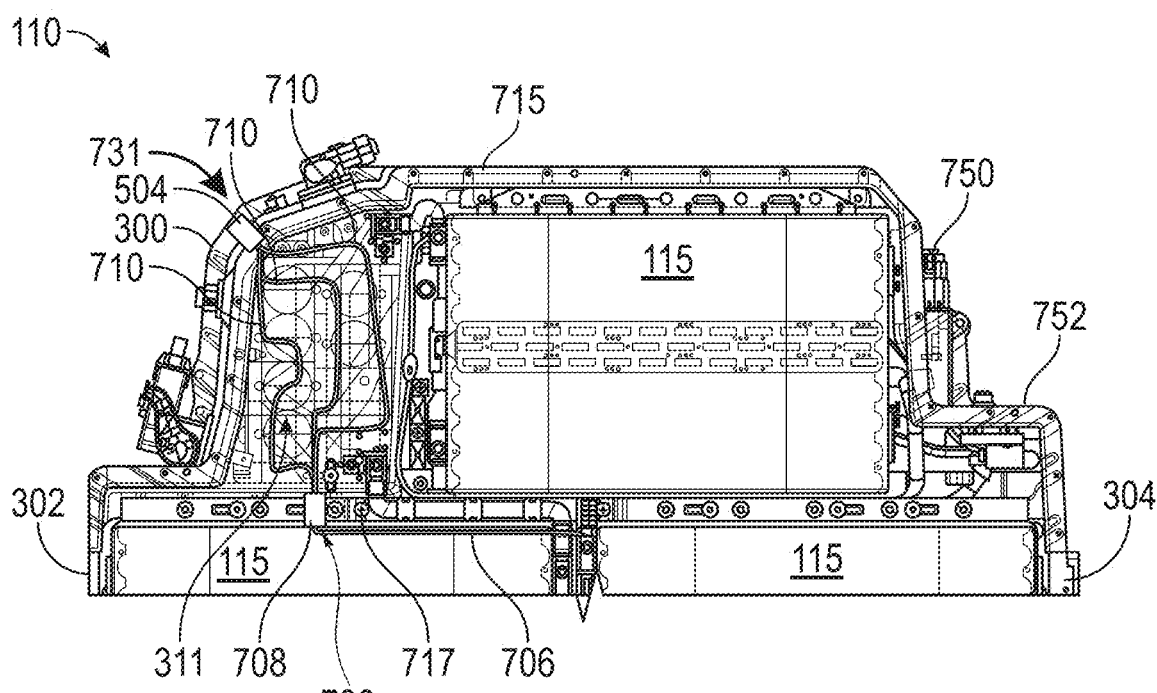
FIG. 8 illustrates a top view of a portion of battery pack with an odd number of battery modules and one or more coolant pathways in accordance with one or more implementations.

FIG. 8 illustrates a portion of a battery pack 110 in the configuration of FIG. 6, in which the battery pack includes an odd number of battery modules 115. In the example of FIG. 8, at least portions of three battery modules 115 are visible, two of which have been installed two of the portions 500 of the cavity 312, and one of which is installed within the cavity 600 in the casted member 300. In the example of FIG. 8, a high voltage distribution box 700 is disposed in the cavity 311. In the examples of FIGS. 7 and/or 8, one or more additional electrical components 702, such as busbars, thermal fuses, contactors, or the like may also be provided within the cavity 311. The high voltage distribution box 700 may be electrically coupled to the battery modules 115, such as via a connector and/or a cable that routes one or more conductive connections from the cavity 311 into the cavity 600 and/or the cavity 312 in which the battery modules 115 are installed. In the example of FIG. 8, the high voltage distribution box 700 is disposed within the cavity 311 defined by the casted member 300, and the casted member 300 includes space (e.g., cavity 600) for a battery module 115.

In both of the examples of FIGS. 7 and 8, thermal management features for the battery pack can be seen. For example, a fitting 504 may be provided in an outer wall 715 of the casted member 300 (e.g., for a coolant port 731). For example, the fitting 504 may be a thread-in fitting that is configured to be screwed into a threaded opening in the outer wall 715 of the casted member 300. In one or more implementations, a coolant source (e.g., a hose or other fluid conduit) may be attached to the fitting 504 (e.g., via a quick connect on the external portion of the fitting 504) in order to provide a coolant or other thermal control fluid from a source external to the enclosure 205 into the casted member 300. As shown, the one or more fluid pathways 710 may be provided that extend within the cavity 311 and/or within the structure of the casted member 300.

As shown, the fluid pathways 710 may route coolant that enters via the fitting 504 to various locations around and/or within the cavity 311. In one or more implementations, the fluid pathways 710 may include fluid channels that are integrally formed within the casted member 300 during the casting process. In one or more implementations, the fluid channels may include one or more (e.g., hoses, channels, and/or or other fluid conduits) that route the coolant through portions of the cavity 311. For example, a manifold may be coupled to an inner end of the fitting 504 that routes the coolant flowing through the fitting 504 into the fluid pathways 710. As discussed in further detail hereinafter, the fluid pathway(s) 710 may be used to move the coolant to one or more locations within the casted member 300 and/or the cavity 311 for cooling the HVDB 700 and/or other electrical components, such as electrical component 702, within the cavity 311.

As shown in both of FIGS. 7 and 8, the battery pack 110 may include an additional fitting, such as fitting 708 (e.g., for a coolant port 733). As shown, the additional fitting 708 may be provided in an interior wall 717 of the casted member 300. For example, the interior wall 717 may separate the cavity 311 in the casted member 300 from the cavity 312 outside the casted member 300. For example, the fitting 708 may be a thread-in fitting that is configured to be screwed into a threaded opening in the interior wall 717 of the casted member 300. As shown, the fluid pathways 710 may route coolant that enters via the fitting 504, through the various locations within the casted member 300 and/or the cavity 311, to the fitting 708 (e.g., to a first end of the fitting 708 that is within the wall of the casted member 300 or within cavity 311). For example, one or more fluid pathways 706 may extend from the fitting 708 into the cavity 312. For example, the one or more fluid pathways 706 (e.g., hoses, channels, and/or or other fluid conduits) may route the coolant (e.g., that has passed through the casted member 300 and/or the cavity 311, and that has cooled the HVDB 700) into contact with the battery modules 115 and/or one or more thermally conductive structures (e.g., cold plates) that are thermally coupled to the battery modules. For example, an additional manifold may be coupled to an inner end of the fitting 708 that routes the coolant flowing through the fluid pathways 710 into the fitting 708 and then into the fluid pathways 706 within the cavity 312.

As shown in FIGS. 7 and 8, the casted member 700 may receive various components of the battery pack 110 (e.g., within openings in the casted member 300) in addition to the fittings for the coolant ports. For example, the battery pack 110 may include one or more venting structures 752, such as pressure release valves (PRVs), installed in one or more openings in the casted member 300, one or more connectors 750, such as drive unit connectors, installed in one or more openings in the casted member 300. In one or more implementations, the casted member 300 may be provided with structural features, such as ribs or other reinforcing features. The structural features may provide additional strength for the enclosure 205 and the battery pack 110, providing robustness to external forces (e.g., linear forces, twisting or bending forces, and/or impact forces).

Figure 9:
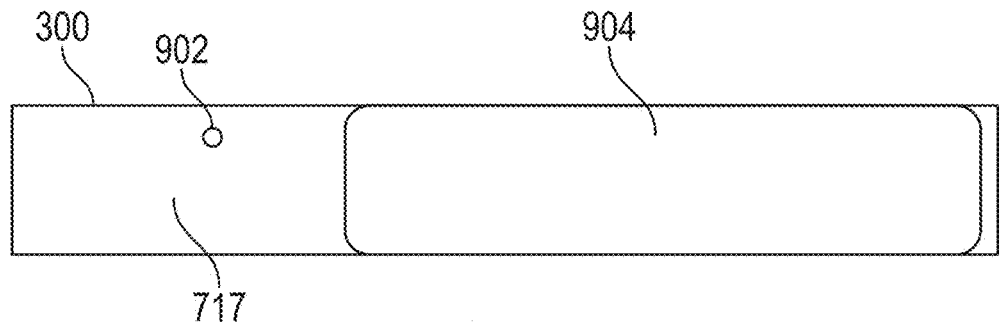
FIG. 9 illustrates a rear view of a casted member of an enclosure for a battery pack in accordance with one or more implementations.

FIG. 9 illustrates a rear view of the casted member 300 in accordance with one or more implementations. In the example of FIG. 9, the casted member 300 includes an interior wall 717 that faces the cavity 312 of the battery pack 110 when the casted member 300 is attached to the extruded sidewall structures 302 and 304 (and thereby to the casted member 306). In this example, the interior wall 717 separates the cavity 312 from the cavity 311 that is within the casted member 300. As shown, the interior wall 717 may be a partial wall and/or may include an opening 904 that extends through to the cavity 600 in the casted member 300. FIG. 9 also illustrates how the casted member 300 may include an opening 902. For example, the opening 902 may be formed using a slide during a die casting operation for forming the casted member 300. For example, the opening 902 may be a threaded opening that is configured to receive a thread-in fitting, such as the fitting 708 of FIGS. 7 and/or 8. The opening 902 may be fluidly coupled to the fluid pathway(s) 710.

Figure 10:
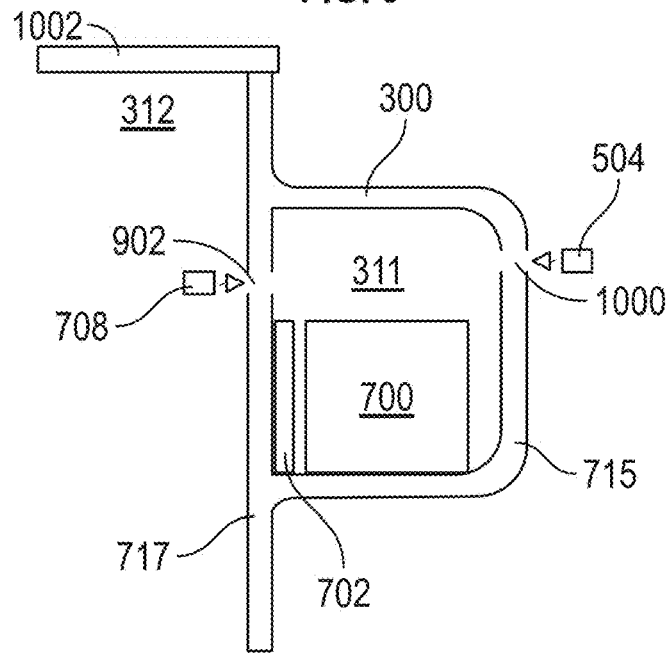
FIG. 10 illustrates a cross-sectional side view of a casted front member of an enclosure for a battery pack, during assembly of the battery pack, in accordance with one or more implementations.

FIG. 10 illustrates a cross-sectional side view of the battery pack 110 during assembly of the battery pack, with the cross section passing through the cavity 311 (e.g., in a direction from a front toward the back of the battery pack 110). As shown in FIG. 10, the interior wall 717 and the outer wall 715 of the casted member 300 may be integrally formed portions of a single unitary casted member 300 that define the cavity 311. FIG. 10 also illustrates how a lid 1002 for the enclosure may be attached to (e.g., a top surface of) the casted member 300, to close the enclosure 205. In this illustrative example, the lid 1002 does not extend over the cavity 311. However, in one or more other implementations, the lid 1002 may have a different configuration, and/or may extend over some or all of the cavity 311.

As shown in FIG. 10, the HVDB 700 may be installed in the cavity 311 formed by the casted member 300. One or more additional electrical components, such as the electrical component 702 (e.g., a busbar, a thermal fuse, or the like) may also be provided within the cavity 311. As shown, the fitting 708 may be provided in (e.g., screwed into) the opening 902 in the interior wall 717 of the casted member 300. As shown, the opening 902 may extend through the entire thickness of the interior wall 717 of the casted member 300 (e.g., to couple to one or more hoses that extend into the cavity 311), or may be a blind opening that extends partially into the interior wall 717 (e.g., to couple to one or more fluid channels integrally formed within the walls of the casted member 300). FIG. 10 also illustrates how the fitting 504 may be provided in (e.g., screwed into) an opening 1000 in the outer wall 715 of the casted member 300. As shown, the opening 1000 may extend through the entire thickness of the outer wall 715 of the casted member 300 (e.g., to couple to one or more hoses that extend into the cavity 311), or may be a blind opening that extends partially into the outer wall 715 (e.g., to couple to one or more fluid channels that are integrally formed within the walls of the casted member 300)

Figure 11A:
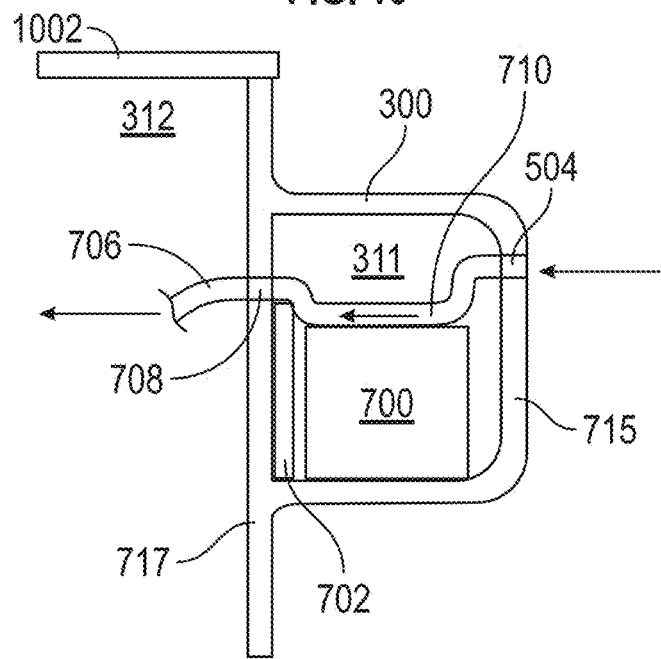
FIGS. 11A-11C illustrates a cross-sectional side views of a casted front member of an enclosure for a battery pack, the casted front member having various respective implementations of fluid pathways, during use of battery pack, in accordance with one or more implementations.
Figure 11B:
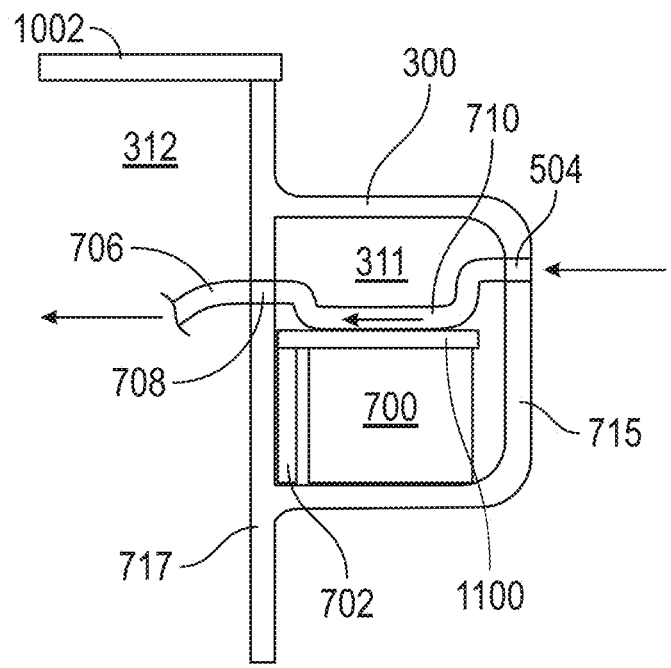
Figure 11C:
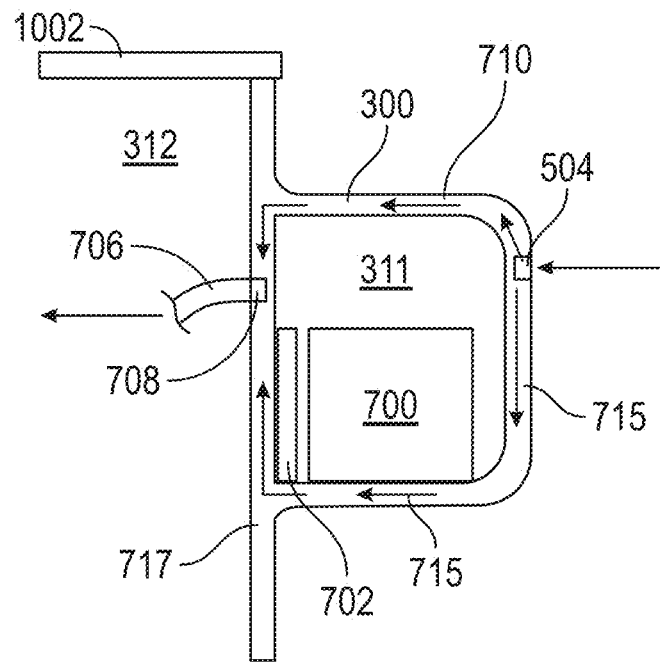

FIGS. 11A-11C illustrate various examples of fluid pathways that may be provided in the casted member 300. Each of FIGS. 11A-11C illustrates a cross-sectional side view of the battery pack 110 during use of (e.g., and cooling of) the battery pack (e.g., after the assembly process illustrated by FIG. 10 is complete), with the cross section passing through the cavity 311 (e.g., in a direction from a front toward the back of the battery pack 110). As shown in the example of FIG. 11A, a coolant may flow into fluid pathway(s) 710, implemented as hoses or other tubes, via the fitting 504 within the opening 1000 in the casted member 300. In this example, the fluid pathway(s) 710 may route the coolant into contact with the HVDB 700 and/or one or more other electrical components, such as the electrical component 702, within the cavity 311. In this way, thermal control (e.g., cooling) may be provided for the HVDB 700 and/or one or more other electrical components, such as the electrical component 702, within the cavity 311. As shown, the fluid pathway(s) 710 may the route the coolant out of the cavity 311 via the fitting 708 within the opening 902 (e.g., to flow into one or more fluid pathways 706 within the cavity 312.

In the example of FIG. 11A, the fluid pathway(s) 710 are shown as hoses or other tubes that extend through the cavity 311 and into direct contact with the HVDB 700 and the electrical component 702. However, this is merely illustrative. For example, as shown in FIG. 11B, in one or more implementations, the fluid pathway(s) 710 that are implemented as hoses or other tubes may route the coolant into thermal contact with one or more thermally conductive structures 1100 (e.g., a cold plate) that are in thermal contact with the HVDB 700 and the electrical component 702. In the examples of FIGS. 11A and 11B, the fluid pathway(s) 710 pass through the cavity 311.

However, as illustrated in FIG. 11C, in one or more other implementations, the fluid pathway(s) 710 may be formed from fluid channels that are integrally formed (e.g., at the time of casting) within the walls of the casted member 300 itself. In this example, the fitting 504 extends partially into the outer wall 715 to fluidly couple a coolant source that is external to the enclosure to one or more fluid channels within the walls of the casted member 300. As shown, the coolant may flow through the fluid channel(s) within the walls of the casted member 300 to the fitting 708 and out of the casted member 300 into the fluid pathway(s) 706. In this example implementation, the HVDB 700 and the electrical component 702 may be thermally coupled to (e.g., and electrically insulated from) the casted member 300 itself, and thereby thermally coupled to the coolant within the fluid pathway(s) 710 (e.g., via a thermal gap pad or the like).

As illustrated by the examples of FIGS. 3-11C, in one or more implementations, an apparatus (e.g., vehicle 100, building 180, battery pack 110) may include a casted member 300 for an enclosure 205 for a battery pack 110, the casted member having a cavity 311 configured to enclose a high voltage distribution box 700, and an opening 1000 configured to receive a fitting 504 for a coolant port (e.g., coolant port 731).

In one or more implementations, the casted member 300 may also include an additional cavity 600 configured to receive a battery module 115 for the battery pack 110, and an additional opening 902 configured to receive an additional fitting 708 for an additional coolant port (e.g., coolant port 733) from the cavity 311 to the additional cavity 600.

The opening 1000 may include a first threaded opening configured to receive a first thread-in fitting (e.g., the fitting 504), and the additional opening 902 may include a second threaded opening configured to receive a second thread-in fitting (e.g., the fitting 708). The casted member 300 may also include an additional opening 902 configured to receive an additional fitting (e.g., the fitting 708) for an additional coolant port (e.g., coolant port 733) from the casted member 300 to an additional cavity 312, external to the casted member 300 and within the enclosure 205, that is configured to receive one or more battery modules 115 for the battery pack 110.

In one or more implementations, the casted member 300 may form a casted front portion of the enclosure 205 for the battery pack 110, the casted member 300 may be configured to attach to first and second sidewalls (e.g., extruded sidewall structures 302 and 304), a base plate (e.g., bottom plate 308), and a lid 1002 for the enclosure, and the battery pack 110 may be configured to provide power for an electric vehicle. The casted member 300 may also include one or more fluid channels (e.g., fluid pathways 710) within one or more walls (e.g., outer wall 715, interior wall 717, a top wall, a bottom wall, etc.) of the casted member 300, the one or more fluid channels (e.g., fluid pathways 710) fluidly coupled to the opening 1000 (e.g., as illustrated in FIG. 11C).

As illustrated by the examples of FIGS. 3-11C, in one or more implementations, a battery pack 110 may include a casted member 300 for an enclosure 205 for the battery pack 110, the casted member having a cavity 311 configured to enclose a high voltage distribution box 700, and an opening 1000 configured to receive a fitting 504 for a coolant port (e.g., coolant port 731). The battery pack 110 may also include the fitting 504 in the opening 1000, the high voltage distribution box 700 disposed within the cavity 311, and one or more fluid channels (e.g., fluid pathways 710) that extend from the fitting 504 to cool the high voltage distribution box 700. The battery pack 110 may also include an additional electrical component 702 in the cavity 311, and at least one of the one or more fluid channels (e.g., fluid pathways 710) that extend from the fitting may be configured to cool the additional electrical component. The additional electrical component may include a busbar that is configured to electrically couple to one or more battery modules 115 within the enclosure 205.

In one or more implementations, at least one of the one or more fluid channels (e.g., fluid pathways 710) is in direct thermal contact with the high voltage distribution box 700 (e.g., as in the example of FIG. 11A). In one or more other implementations, the battery pack 110 may also include a cooling structure (e.g., thermally conductive structure 1100, and/or a gap pad) that thermally couples the one or more fluid channels (e.g., fluid pathways 710) to the high voltage distribution box 700 (e.g., as in the examples of FIG. 11B or 11C).

The casted member 300 may also include an additional opening 902 configured to receive an additional fitting 708 for an additional coolant port (e.g., coolant port 733). In one or more implementations, the opening 1000 is formed in an outer wall 715 of the casted member 300, and the additional opening 902 is formed in an inner wall (e.g., interior wall 717) of the casted member 300. In one or more implementations, the battery pack 110 may also include a plurality of housing structures (e.g., extruded sidewall structure 302, extruded sidewall structure 304, casted member 306, and/or bottom plate 308) that combine with the casted member 300 to form the enclosure 205 of the battery pack 110, and one or more battery modules 115 disposed in an additional cavity 312, separate from the cavity 311, within the enclosure 205.

In one or more implementations, the battery pack may 110 may also include the fitting 504 in the opening 1000, the additional fitting 708 in the additional opening 902, the high voltage distribution box 700 disposed within the cavity 311, one or more fluid channels (e.g., fluid pathways 710) within one or more walls (e.g., walls 715 and/or 717, a top wall, a bottom wall, etc.) of the casted member 300 that extend from the fitting 504 to the additional fitting 708 to cool the high voltage distribution box 700, and one or more fluid channels (e.g., fluid pathways 706) coupled to the additional fitting 708 and configured to cool the one or more battery modules 115.

Figure 12:
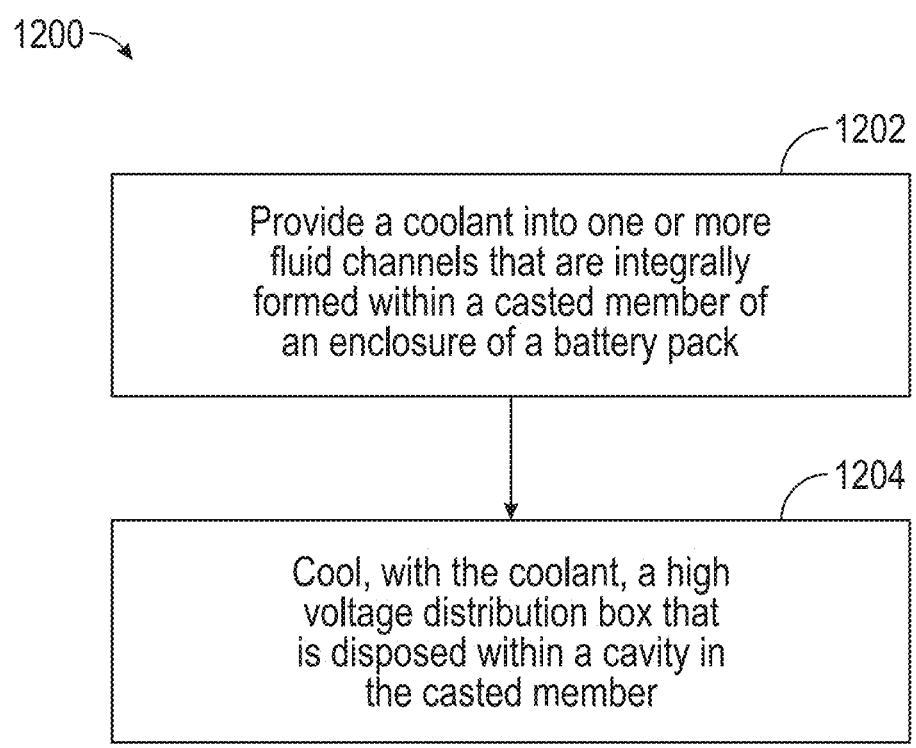
FIG. 12 is a flow chart of illustrative operations that may be performed for thermal management for a battery pack in accordance with one or more implementations.

FIG. 12 illustrates a flow diagram of an example process 1200 that may be performed for thermal management for a battery pack, in accordance with implementations of the subject technology. For explanatory purposes, the process 1200 is primarily described herein with reference to the battery pack 110 of FIGS. 1A-2A. However, the process 1200 is not limited to the 1200 of FIG. 1, and one or more blocks (or operations) of the process 1200 may be performed by one or more other structural components of other suitable moveable apparatuses, devices, or systems. Further for explanatory purposes, some of the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

As illustrated in FIG. 12, at block 1202, a coolant may be provided (e.g., as illustrated in FIG. 11C) into one or more fluid channels (e.g., fluid pathways 710) that are integrally formed within an enclosure (e.g., enclosure 205) of a battery pack (e.g., battery pack 110).

At block 1204, the coolant may cool a high voltage distribution box (e.g., HVDB 700) that is disposed within a cavity 311 in the casted member. In one or more implementations, the cavity may be a first cavity within the enclosure, and the process 1200 may also include providing the coolant that has cooled the high voltage distribution box into a second cavity (e.g., cavity 312) within the enclosure, the second cavity enclosing one or more battery cells (e.g., battery cells 120, such as in one or more battery modules 115) of the battery pack, and cooling, with the coolant, the one or more battery cells within the second cavity.

Aspects of the subject technology can help improve the thermal management of battery packs, which can improve the efficiency, range, charging rate, power delivery, and proliferation of electric vehicles, which can help to mitigate climate change by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
   a unitary casted member for an enclosure for a battery pack, the unitary casted member comprising:
   a cavity configured to enclose a high voltage distribution box; and
   an opening configured to receive a fitting for a coolant port, wherein the unitary casted member comprises a unitary casted front portion of the enclosure for the battery pack, wherein the unitary casted member is configured to attach to first and second sidewalls, a base plate, and a lid for the enclosure, and wherein the battery pack is configured to provide power for an electric vehicle.

2. The apparatus of claim 1, wherein the unitary casted member further comprises an additional cavity configured to receive a battery module for the battery pack, and an additional opening configured to receive an additional fitting for an additional coolant port to the additional cavity.

3. The apparatus of claim 2, wherein the opening comprises a first threaded opening configured to receive a first thread-in fitting, and wherein the additional opening comprises a second threaded opening configured to receive a second thread-in fitting.

4. The apparatus of claim 1, wherein the unitary casted member further comprises an additional opening configured to receive an additional fitting for an additional coolant port to an additional cavity, external to the unitary casted member and within the enclosure, that is configured to receive one or more battery modules for the battery pack.

5. The apparatus of claim 4, wherein the opening comprises a first threaded opening configured to receive a first thread-in fitting, and wherein the additional opening comprises a second threaded opening configured to receive a second thread-in fitting.

6. The apparatus of claim 1, wherein the unitary casted member further comprises one or more fluid channels within one or more walls of the unitary casted member, the one or more fluid channels fluidly coupled to the opening.

7. A battery pack, comprising:
   a casted member for an enclosure for the battery pack, the casted member comprising:
   a cavity configured to enclose a high voltage distribution box; and
   an opening configured to receive a fitting for a coolant port;
   the fitting in the opening;
   the high voltage distribution box disposed within the cavity;
   one or more fluid channels that extend from the fitting to cool the high voltage distribution box; and
   an additional electrical component in the cavity, wherein at least one of the one or more fluid channels that extend from the fitting are configured to cool the additional electrical component.

8. The battery pack of claim 7, wherein the additional electrical component comprises a busbar that is configured to electrically couple to one or more battery modules within the enclosure.

9. The battery pack of claim 7, wherein at least one of the one or more fluid channels is in direct thermal contact with the high voltage distribution box.

10. The battery pack of claim 7, further comprising a cooling structure that thermally couples the one or more fluid channels to the high voltage distribution box.

11. The battery pack of claim 7, wherein the casted member further comprises an additional opening configured to receive an additional fitting for an additional coolant port out of the cavity.

12. The battery pack of claim 11, wherein the opening is formed in an outer wall of the casted member, and wherein the additional opening is formed in an inner wall of the casted member.

13. The battery pack of claim 12, further comprising a plurality of housing structures that combine with the casted member to form the enclosure of the battery pack, and one or more battery modules disposed in an additional cavity, separate from the cavity, within the enclosure.

14. The battery pack of claim 13, further comprising the additional fitting in the additional opening, wherein the one or more fluid channels are disposed within one or more walls of the casted member and extend from the fitting to the additional fitting to cool the high voltage distribution box, and wherein the battery pack further comprises one or more additional fluid channels coupled to the additional fitting and configured to cool the one or more battery modules.

15. A method, comprising:
   providing a coolant into one or more fluid channels that are integrally formed within a unitary casted member of an enclosure of a battery pack, via a fitting for a coolant port in the unitary casted member; and
   cooling, with the coolant, a high voltage distribution box that is disposed within a cavity in the unitary casted member, wherein the unitary casted member comprises a unitary casted front portion of the enclosure for the battery pack, wherein the unitary casted member is configured to attach to first and second sidewalls, a base plate, and a lid for the enclosure, and wherein the battery pack is configured to provide power for an electric vehicle.

16. The method of claim 15, wherein the cavity comprises a first cavity within the enclosure, and wherein the method further comprises:
   providing the coolant that has cooled the high voltage distribution box from the one or more fluid channels into a second cavity within the enclosure, the second cavity enclosing one or more battery cells of the battery pack; and cooling, with the coolant, the one or more battery cells within the second cavity.

* * * * *